US010526991B2

(12) United States Patent
Komeno et al.

(10) Patent No.: US 10,526,991 B2
(45) Date of Patent: Jan. 7, 2020

(54) ABNORMALITY DETECTION DEVICE, ABNORMALITY DETECTION METHOD, AND ABNORMALITY DETECTION SYSTEM

(71) Applicant: ISUZU MOTORS LIMITED, Shinagawa-ku, Tokyo (JP)

(72) Inventors: Naotoshi Komeno, Hatsukaichi (JP); Katsushi Shidomi, Fujisawa (JP); Ryousuke Akimoto, Fujisawa (JP); Yuuji Fujikawa, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/091,487

(22) PCT Filed: Mar. 31, 2017

(86) PCT No.: PCT/JP2017/013639
§ 371 (c)(1),
(2) Date: Oct. 4, 2018

(87) PCT Pub. No.: WO2017/175678
PCT Pub. Date: Oct. 12, 2017

(65) Prior Publication Data
US 2019/0120158 A1 Apr. 25, 2019

(30) Foreign Application Priority Data
Apr. 4, 2016 (JP) .................................. 2016-075411

(51) Int. Cl.
*F02D 41/22* (2006.01)
*F02D 29/02* (2006.01)
(Continued)

(52) U.S. Cl.
CPC ........... *F02D 41/221* (2013.01); *F02D 29/02* (2013.01); *G07C 5/008* (2013.01); *G07C 5/0816* (2013.01); *F02D 2041/228* (2013.01)

(58) Field of Classification Search
CPC ........ F02D 41/22; F02D 41/221; F02D 29/02; F02D 2041/228; G07C 5/008; G07C 5/0816
See application file for complete search history.

(56) References Cited

U.S. PATENT DOCUMENTS 4,854,283 A  8/1989  Kiyono et al.
5,561,610 A  10/1996  Schricker et al.
(Continued)

FOREIGN PATENT DOCUMENTS

JP  H07-074623 B2  8/1995
JP  H08-054924 A  2/1996
(Continued)

OTHER PUBLICATIONS

International Search Report and Written Opinion for related International Application No. PCT/JP20171013639, dated May 23, 2017; English translation of ISR provided; 10 pages.
(Continued)

*Primary Examiner* — Hieu T Vo
(74) *Attorney, Agent, or Firm* — Procopio, Cory, Hargreaves & Savitch LLP

(57) ABSTRACT

An abnormality detection device includes: an opening degree acquisition unit, which acquires a plurality of opening degree data indicating an opening degree of a valve provided in a vehicle, the opening degree being measured during a certain period; an integration unit, which calculates an integrated value of a plurality of differences by integrating the plurality of differences between a plurality of opening degree actual measurement values indicated by the
(Continued)

plurality of opening degree data acquired by the opening degree acquisition unit and an opening degree target value of the valve; and a determination unit, which determines that there is an abnormality in the vehicle when the integrated value integrated by the integration unit is higher than a certain value.

6 Claims, 6 Drawing Sheets

(51) Int. Cl.
*G07C 5/00* (2006.01)
*G07C 5/08* (2006.01)

(56) References Cited

U.S. PATENT DOCUMENTS

| | | |
|---|---|---|
| 5,950,147 A | 9/1999 | Sarangapani et al. |
| 6,135,085 A | 10/2000 | Toyohara et al. |
| 6,622,072 B2 * | 9/2003 | Asumi ............... F16H 9/12 474/100 |
| 9,889,839 B2 * | 2/2018 | Iwagami ......... F02D 41/0215 |
| 2005/0138997 A1 | 6/2005 | Okumura |
| 2006/0025966 A1 | 2/2006 | Kanamaru |
| 2012/0277979 A1 | 11/2012 | Kato et al. |
| 2014/0332705 A1 | 11/2014 | Stubbs |

FOREIGN PATENT DOCUMENTS

| | | |
|---|---|---|
| JP | 2000-516374 A | 12/2000 |
| JP | 2005-188309 A | 7/2005 |
| JP | 2005-188501 A | 7/2005 |
| JP | 2011-185727 A | 9/2011 |
| JP | 2015-218708 A | 12/2015 |

OTHER PUBLICATIONS

Extended European Search Report dated Mar. 14, 2019 for corresponding European Patent Application No. 17779057.3, in 8 pages.

* cited by examiner

ABNORMALITY DETECTION DEVICE, ABNORMALITY DETECTION METHOD, AND ABNORMALITY DETECTION SYSTEM

CROSS-REFERENCE TO RELATED APPLICATIONS

This application is a U.S. National Stage entry of PTC Application No: PTC/JP 2017/013639 filed on Mar. 31, 2017, which claims priority to Japanese Patent Application No. 2016-075411, filed Apr. 04, 2016, the contents of which are incorporated herein by reference.

TECHNICAL FIELD

The present disclosure relates to an abnormality detection device, an abnormality detection method, and an abnormality detection system, which detect abnormality of a valve of a vehicle.

BACKGROUND ART

A fault diagnostic system that detects malfunction of a valve by comparing a measurement value of an opening degree of a valve of a vehicle with a determination value is known. Patent Literature 1 discloses a technology of determining a failure when a terminal voltage of a valve significantly differs from a predefined normal value.

CITATION LIST

Patent Literature

[Patent Literature 1]: JP-A-2005-188501

SUMMARY

Technical Problem

In background art, existence of an abnormality is determined by comparing one measurement result with a normal value. Thus, when the measurement result is varied due to an effect of a driving condition of a vehicle, a surrounding environment, or the like, it may be erroneously determined that an abnormality has occurred even though an abnormality has not occurred.

In this regard, the present disclosure provides an abnormality detection device, an abnormality detection method, and an abnormality detection system capable of improving precision of detecting an abnormality of a valve.

Solution to Problem

According to a first aspect of the present disclosure, there is provided an abnormality detection device including: an acquisition unit, which acquires a plurality of opening degree data indicating an opening degree of a valve included in a vehicle, the opening degree being measured during a certain period; an integration unit, which calculates an integrated value of a plurality of differences by integrating the plurality of differences between a plurality of opening degree actual measurement values indicated by the plurality of opening degree data acquired by the acquisition unit and an opening degree target value of the valve; and a determination unit, which determines that there is an abnormality in the vehicle when the integrated value integrated by the integration unit is higher than a certain value.

In the abnormality detection device described above, the integration unit may calculate a normalized integrated value by converting the integrated value obtained by integrating the plurality of differences between the plurality of opening degree actual measurement values measured during the certain period and the opening degree target value into an integrated value of a reference period, and the determination unit may determine that there is an abnormality in the vehicle when the normalized integrated value is higher than the certain value.

In the abnormality detection device described above, the abnormality detection device may further include a storage unit, which stores the integrated value calculated based on the plurality of differences between the plurality of opening degree actual measurement values measured during a plurality of certain periods and the opening degree target value, in association with a period when the plurality of opening degree actual measurement values are measured, wherein the determination unit may determine an abnormality of the vehicle based on a changing tendency of a plurality of the integrated values in the plurality of certain periods.

In the abnormality detection device described above, the acquisition unit may acquire the opening degree data in association with state information indicating a state of the vehicle, and the integration unit may calculate the integrated value of the plurality of differences by integrating the plurality of differences between the plurality of opening degree actual measurement values and the opening degree target value corresponding to the state information.

According to a second aspect of the present disclosure, there is provided an abnormality detection method performed by a computer, the including: acquiring a plurality of opening degree data indicating an opening degree of a valve included in a vehicle, the opening degree being measured during a certain period; calculating an integrated value of a plurality of differences by integrating the plurality of differences between a plurality of opening degree actual measurement values indicated by the acquired plurality of opening degree data and an opening degree target value of the valve; and determining that there is an abnormality in the vehicle when the integrated value is higher than a certain value.

According to a third aspect of the present disclosure, there is provided an abnormality detection system including: an opening degree detection device mounted on a vehicle; and an abnormality detection device for detecting an abnormality of a valve based on an opening degree of the valve detected by the opening degree detection device, wherein the opening degree detection device includes a detection unit, which detects the opening degree of the valve, and a communication unit, which transmits opening degree data indicating the opening degree to the abnormality detection device via a wireless communication line, and the abnormality detection system further includes an acquisition unit, which acquires a plurality of opening degree data indicating an opening degree of a valve included in a vehicle, the opening degree being measured during a certain period, an integration unit, which calculates an integrated value of a plurality of differences by integrating the plurality of differences between a plurality of opening degree actual measurement values indicated by the plurality of opening degree data acquired by the acquisition unit and an opening degree target value of the valve, and a determination unit, which determines that there is an abnormality in the vehicle when the integrated value integrated by the integration unit is higher than a certain value.

Advantageous Effects of the Invention

According to the present disclosure, an effect of improving prediction of detecting an abnormality of a valve may be obtained.

DESCRIPTION OF EMBODIMENTS

<First Embodiment>

Figure 1:
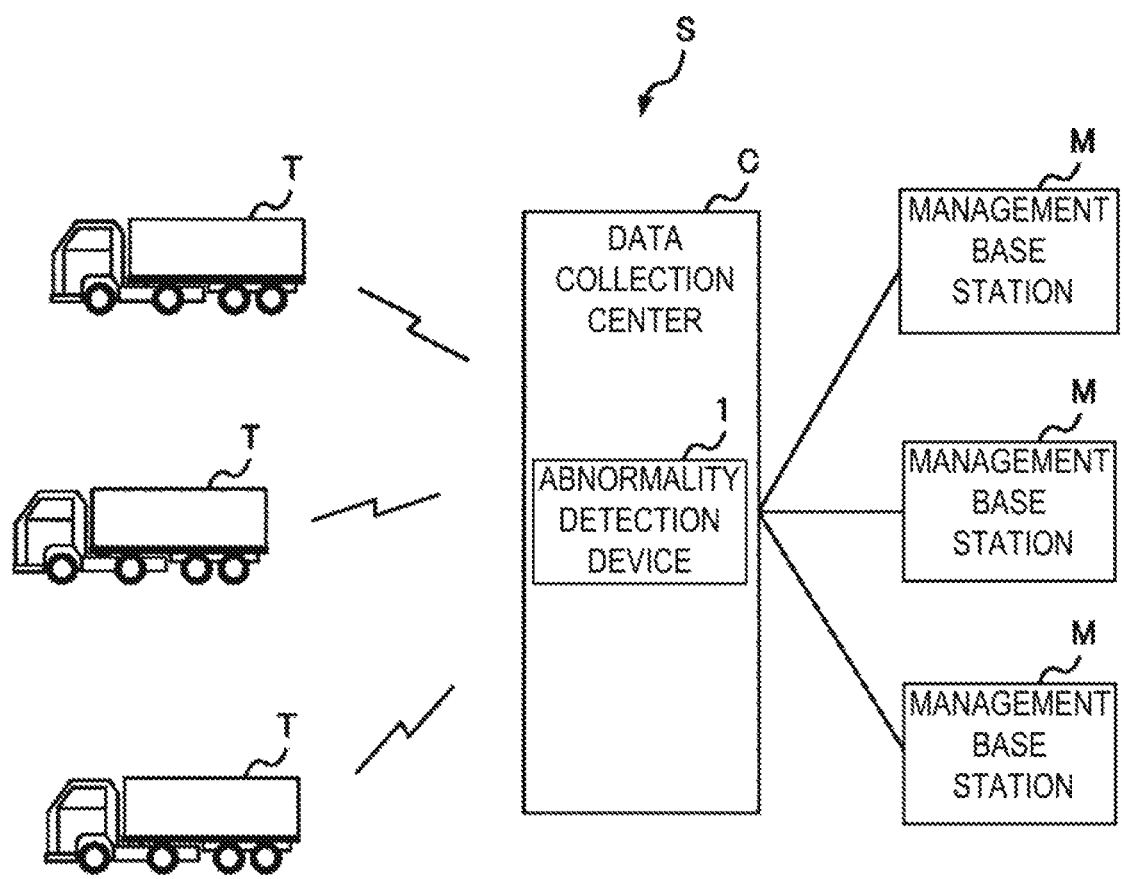
FIG. 1 is a diagram showing a configuration of an abnormality detection system according to an embodiment.

FIG. 1 is a diagram showing a configuration of an abnormality detection system S according to an embodiment. The abnormality detection system S is a system in which an abnormality detection device 1 and a vehicle T operate in association with each other to detect an abnormality of the vehicle T. The abnormality detection device 1 is installed in a data collection center C that collects data indicating states of various vehicles T. The abnormality detection device 1 is connected to a plurality of vehicles T via a wireless communication line to receive the data indicating the states of the vehicles T from the respective vehicles T every certain time interval. The abnormality detection device 1 detects the abnormality of the vehicle T based on various types of data received from the vehicle T.

The abnormality detection device 1 is connected to a computer installed in a management base station M that manages the vehicle T, through a network (for example, the Internet). The management base station M is, for example, a facility of a company that owns the vehicle T or a company that maintains the vehicle T. Upon receiving a notification that an abnormality has occurred in the vehicle T from the abnormality detection device 1, an employee of the management base station M may notify a driver of the vehicle T that the abnormality has occurred or maintain the vehicle T, thereby preventing a serious accident in advance.

Various valves are mounted on the vehicle T of the present embodiment. For example, the vehicle T includes an intake throttle valve mounted on an intake and exhaust system, an Exhaust Gas Recirculation (EGR) valve, a blow-off valve mounted on a turbocharger, and a valve for rail pressure control. In following description, an operation when an abnormality o f the EGR valve from among the valves mounted on the vehicle T is detected is described, but the present disclosure may be applied to an arbitrary valve mounted on the vehicle T.

[Configuration of Intake and Exhaust System 2]

Figure 2:
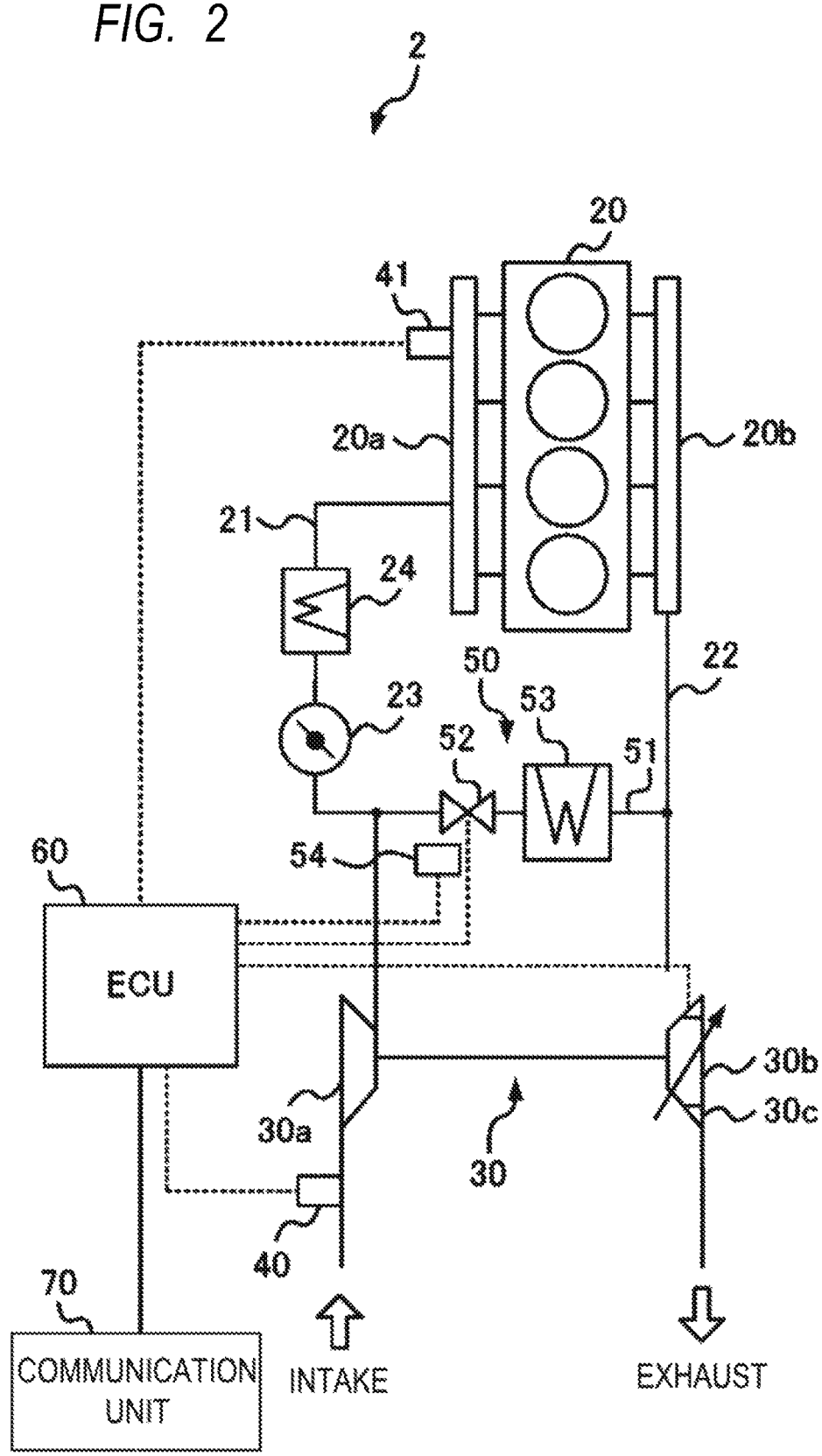
FIG. 2 is a diagram showing a configuration of an intake and exhaust system of a vehicle.

FIG. 2 is a diagram showing a configuration of an intake and exhaust system 2 of the vehicle T. An intake passage 21 is connected to an intake manifold 20a of an engine 20, and an exhaust passage 22 is connected to an exhaust manifold 20b. A compressor 30a of a variable nozzle turbo 30, a throttle valve 23, and an intercooler 24 are provided in the intake passage 21 sequentially from an upstream side, and a turbine 30b of the variable nozzle turbo 30 is provided in the exhaust passage 22.

An intake flow rate sensor 40 is provided at an intake upstream side of the compressor 30a. Also, an intake pressure sensor 41 is provided at the intake manifold 20a. A detected value (hereinafter, referred to as intake amount) of the intake flow rate sensor 40 and a detected value (hereinafter, referred to as intake pressure) of the intake pressure sensor 41 are input to an engine control unit (ECU) 60 electrically connected thereto.

The variable nozzle turbo 30 includes the compressor 30a provided at the intake passage 21, the turbine 30b provided at the exhaust passage 22, and a variable nozzle 30c provided at the turbine 30b. The compressor 30a and the turbine 30b are connected via a rotation shaft.

An EGR device 50 includes an EGR passage 51 for communicating the exhaust passage 22 on an exhaust upstream side from the turbine 30b and the intake passage 21 on the intake upstream side from the intercooler 24, an EGR valve 52 for adjusting a flow rate of an EGR gas, an EGR cooler 53 for cooling the EGR gas, and an opening degree sensor 54 for detecting an opening degree of the EGR valve 52. The flow rate of the EGR gas in the EGR device 50 is adjusted when the opening degree of the EGR valve 52 is controlled according to an opening degree control signal output from the ECU 60.

The ECU 60 performs various controls, such as fuel injection of the engine 20, control of the opening degree of the EGR valve 52 included in the EGR device 50, and the like. The ECU 60 includes a central processing unit (CPU), a read only memory (ROM), a random access memory (RAM), an input port, an output port, and the like.

Also, the ECU 60 associates opening degree data indicating the opening degree of the EGR valve 52 detected by the opening degree sensor 54 with a time when the opening degree is measured and a value of the opening degree control signal at a timing when the opening degree is measured, and stores the opening degree data in the RAM. For example, the ECU 60 distinguishes opening degree data measured at timing when the opening degree of the EGR valve 52 is instructed to be 0% and opening degree data measured at timing when the opening degree of the EGR valve 52 is instructed to be 100%, and stores the opening degree data in the RAM.

A communication unit 70 is a wireless communication unit for transmitting and receiving data via a wireless communication line. The communication unit 70 transmits various types of data acquired from the ECU 60 to the abnormality detection device 1, and at the same time, receives various types of data transmitted by the abnormality detection device 1 and notifies the ECU 60. The communication unit 70 transmits, for example, opening degree data indicating an opening degree detected by the opening degree sensor 54 during a certain period and temporarily accumulated by the ECU 60 to the abnormality detection device 1 every certain time interval. Here, the communication unit 70 transmits the opening degree data in association with control content (for example, a set value of the opening degree) indicated by opening degree control information at the timing when the opening degree is measured. As described above, the opening degree sensor 54, the ECU 60, and the communication unit 70 operate in association with each other to function as an opening degree detection device.

When the EGR valve 52 deteriorates, a response time of a change of the opening degree of the EGR valve 52 with respect to a change of the opening degree control information may increase, or an actual measurement value of the opening degree may deviate from a normal value. Therefore, in the intake and exhaust system 2 according to the present embodiment, the communication unit 70 transmits the opening degree data to the abnormality detection device 1 every certain time interval such that the abnormality detection device 1 may detect occurrence of an abnormality in the EGR valve 52, based on an integrated value of a difference between an actual measurement value of the opening degree during the certain period and a target value.

[Configuration of Abnormality Detection Device 1]

Figure 3:
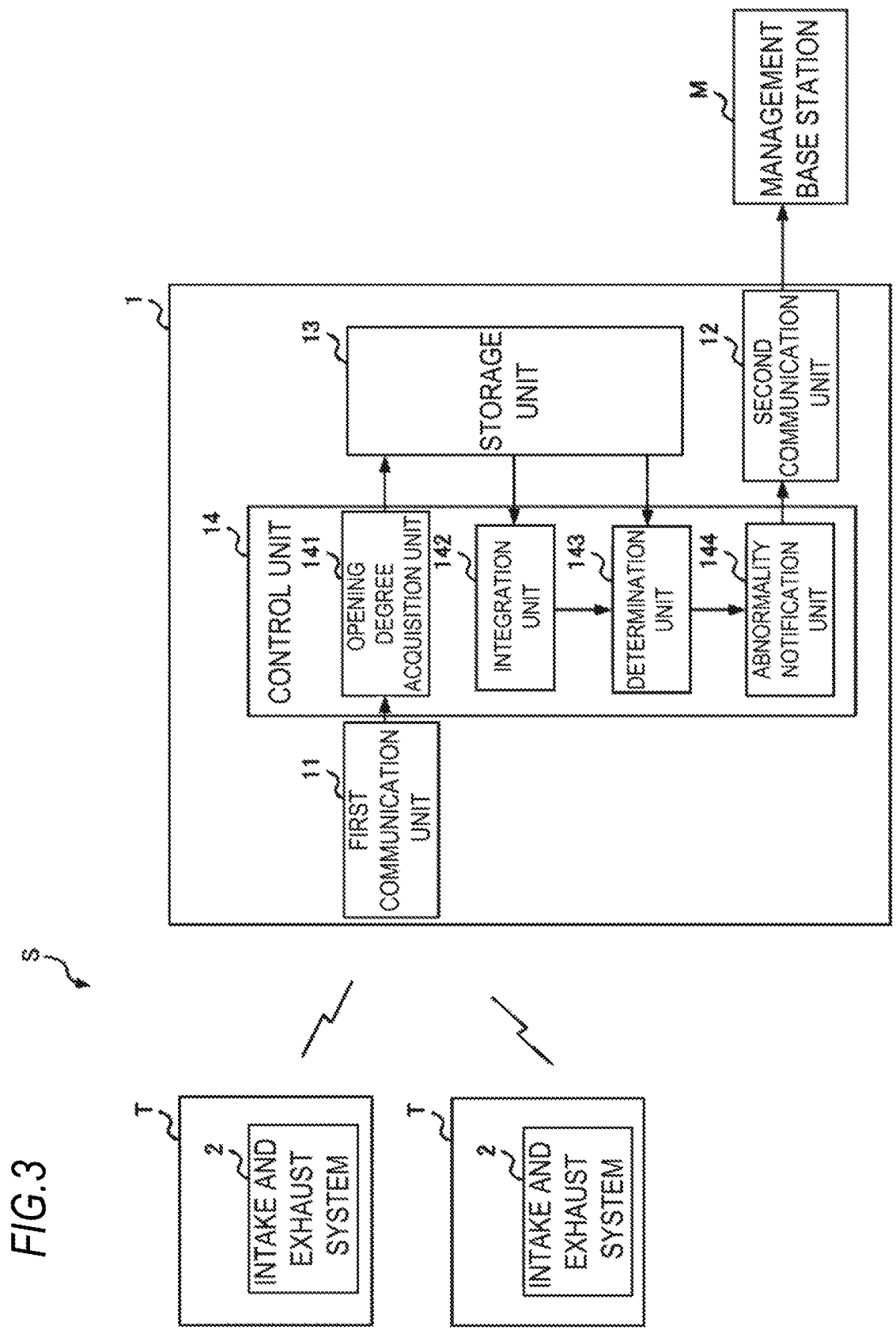
FIG. 3 is a diagram showing a configuration of an abnormality detection device.

FIG. 3 is a diagram showing a configuration of the abnormality detection device 1.

The abnormality detection device 1 includes a first communication unit 11, a second communication unit 12, a storage unit 13, and a control unit 14. The control unit 14 includes an opening degree acquisition unit 141, an integration unit 142, a determination unit 143, and an abnormality notification unit 144.

The first communication unit 11 is a wireless communication unit for transmitting and receiving data to and from the intake and exhaust system 2 via a wireless communication line. For example, the first communication unit 11 receives radio waves including various types of data, such as the opening degree data from a pre-registered plurality of vehicles T, via a computer of a packet communication network. The first communication unit 11 extracts the opening degree data included in the radio waves, and inputs the opening degree data to the opening degree acquisition unit 141.

The second communication unit 12 is a communication controller for transmitting and receiving data to and from a computer of the management base station M via the Internet. When the determination unit 143 detects an abnormality of the EGR valve 52 of the vehicle T, the second communication unit 12 transmits a message notifying the abnormality to the computer of the management base station M managing the vehicle T.

The storage unit 13 is a storage medium including ROM, RAM, a hard disk, and the like. The storage unit 13 stores programs executed by the control unit 14. Also, the storage unit 13 stores a target value of an opening degree, which is used by the determination unit 143 to detect an abnormality of the EGR valve 52. Since the target value of the opening degree varies according to types of the vehicle T, the storage unit 13 stores the target value, for example, in association with the type of the vehicle T. The storage unit 13 may periodically update the target value of the opening degree, based on opening degree data acquired from a plurality of same type of vehicles T.

When the vehicle T transmits the opening degree data, the storage unit 13 stores the transmitted opening degree data in association with identification information unique to each vehicle T and the timing when the opening degree is measured. Also, the storage unit 13 stores an integrated value calculated by the integration unit 142 described below, for every certain period (for example, one day).

The control unit 14 is, for example, a CPU, and functions as the opening degree acquisition unit 141, the integration unit 142, the determination unit 143, and the abnormality notification unit 144 by executing programs stored in the storage unit 13.

The opening degree acquisition unit 141 acquires the opening degree indicating the actual measurement values of the opening degree in a state where the EGR valve 52 is set to a certain opening degree, the actual measurement values being measured at a plurality of different times, via the first communication unit 11. Since the vehicle T transmits the opening degree data in association with the value of the opening degree control information at the timing when the opening degree is measured, the opening degree acquisition unit 141 stores the acquired opening degree data in the storage unit 13 in association with the timing when the opening degree is measured and the value of the opening degree control information at the timing when the opening degree is measured.

The integration unit 142 calculates an integrated value of differences by integrating the differences between a plurality of opening degree actual measurement values indicated by a plurality of opening degree data acquired by the opening degree acquisition unit 141 and an opening degree target value of the EGR valve 52. The difference may be calculated as an absolute value of a difference between the opening degree actual measurement value and the opening degree target value, or may be calculated as a difference including a sign.

Figure 4A:
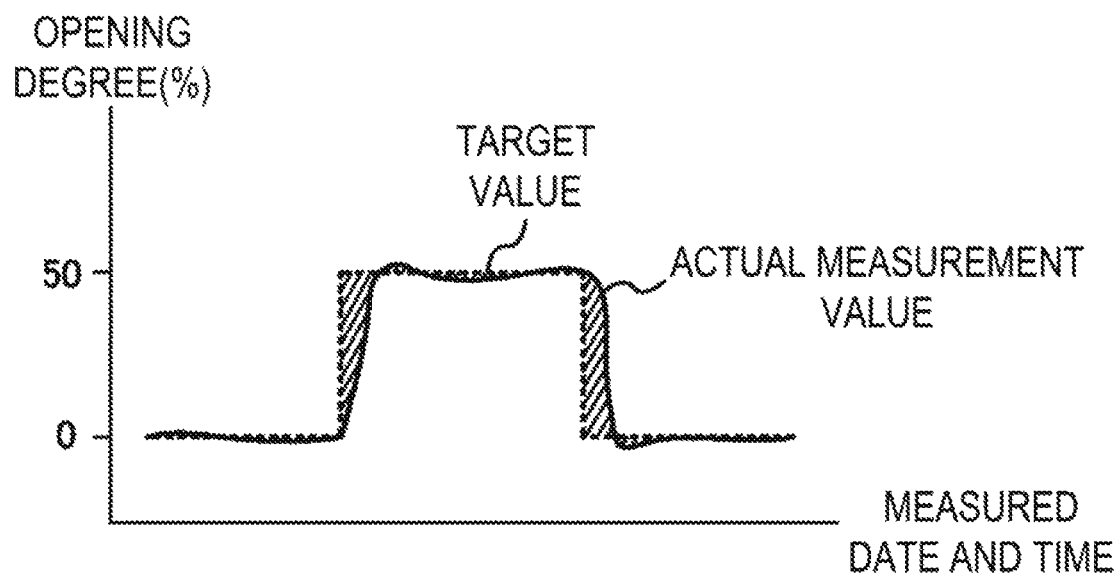
FIGS. 4A and 4B are diagrams for describing integrated values of differences.
Figure 4B:
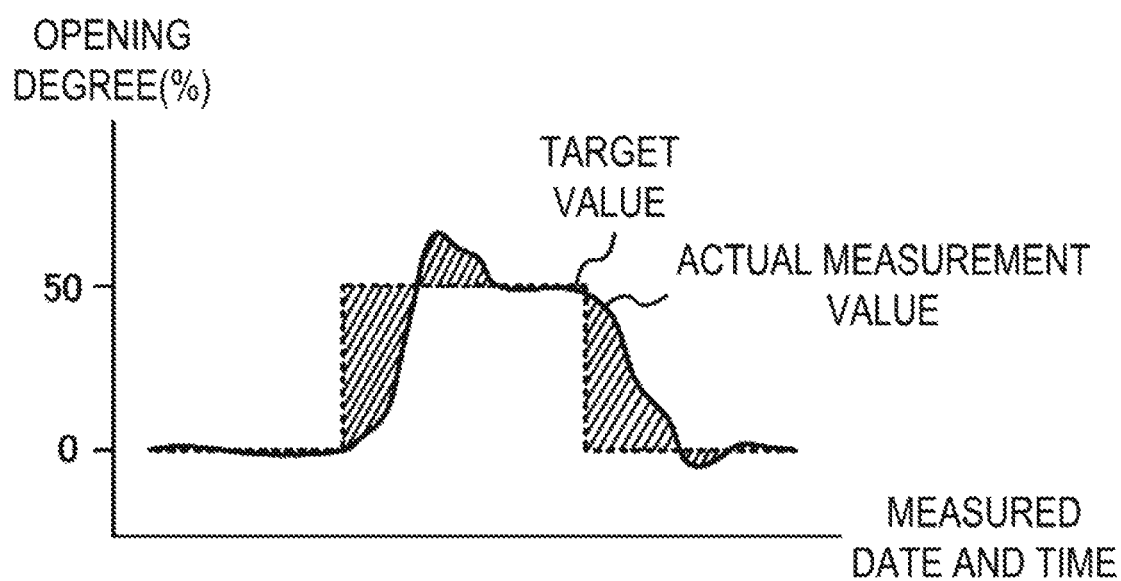

FIGS. 4A and 4B are diagrams for describing integrated values of differences. In FIG. 4, a horizontal axis indicates date and time when an opening degree is measured, and a vertical axis indicates the opening degree. In FIG. 4, a solid line indicates an actual measurement value of an opening degree indicated by opening degree data acquired by the opening degree acquisition unit 141, and a broken line indicates an opening degree target value. The opening degree target value corresponds to a value of opening degree control information, and in FIG. 4, the target value is changing from an opening degree of 0% (a completely closed state) to an opening degree of 50% (a half closed state).

The EGR valve 52 requires a response time from when the value of the opening degree control information is changed to when the opening degree is actually changed. As a result, there are differences between the opening degree actual measurement values and the opening degree target values in regions indicated by diagonal lines in FIGS. 4A and 4B. The integration unit 142 calculates the integrated value of the differences by calculating a difference value between the opening degree actual measurement value indicated by the opening degree data and the opening degree target value, and adding the difference values corresponding to the opening degree actual measurement value measured during a certain period. The integrated values calculated by the integration unit 142 as such correspond to areas of the regions indicated by the diagonal lines in FIG. 4.

By comparing FIG. 4A to FIG. 4B, it is determined that the area of the region indicated by the diagonal lines in FIG. 4B is larger than the area of the region indicated by the diagonal lines in FIG. 4A. It is assumed that in FIG. 4B, the response time with respect to a change of the value of the opening degree control information is longer than the response time in FIG. 4A, and the EGR valve 52 is deteriorated. In this case, the integrated value in FIG. 4B is larger than the integrated value in FIG. 4A. The integration unit 142 inputs the calculated integrated value to the determination unit 143.

A period when the integration unit 143 integrates the differences is arbitrary. For example, the integration unit 142 integrates the differences in units of one day, and notifies the integrated value to the determination unit 143 in units of one day. Then, when a day changes, the integration unit 142 initializes the integrated value and calculates a new integrated value.

The determination unit 143 determines an abnormality of the EGR valve 52 based on the integrated value of the differences between the plurality of opening degree actual measurement values measured during a certain period and the opening degree target value. For example, the determination unit 143 compares the integrated value with a certain threshold value, and determines that the abnormality has occurred in the EGR valve 52 when the integrated value is higher than the threshold value.

When the determination unit 143 determined that the abnormality has occurred in the EGR valve 52, the abnormality notification unit 144 notifies the computer of the management base station M that the abnormality has occurred. In detail, the abnormality notification unit 144 notifies the computer of the management base station M that the abnormality has occurred in the EGR valve 52 by preparing an abnormality notification message including identification information of the vehicle T where the abnormality has occurred, an address of the computer of the management base station M managing the vehicle T, and the occurrence of the abnormality, and transmitting the abnormality notification message through the second communication unit 12.

[Normalization of Integrated Value]

As described above, the abnormality detection device 1 determines existence of the abnormality based on the integrated value of the differences between the opening degree actual measurement values that are continuously measured and the opening degree target value, but a timing when the opening degree actual measurement value is measured is not constant. For example, when the vehicle T travels a long distance, the abnormality detection device 1 is able to acquire the opening degree actual measurement value measured for a long time, but when the vehicle T travels only a short distance, the abnormality detection device 1 is able to acquire only the opening degree actual measurement value for a short time. As such, when the number of opening degree actual measurement values to be integrated varies, precision of detecting an abnormality is decreased.

Therefore, the integration unit 142 calculates a normalized integrated value by converting the integrated value obtained by integrating the differences between the plurality of opening degree actual measurement values measured during a traveling period of the vehicle T and the opening degree target value into an integrated value of a reference period. Then, the determination unit 143 determines that the vehicle has the abnormality when the normalized integrated value is higher than the certain threshold value. For example, when the reference period is 30 minutes and the opening degree acquisition unit 141 acquires the opening degree actual measurement value for two hours, the integration unit 142 calculates the normalized integrated value converted to the reference period by dividing the integrated value obtained by the opening degree actual measurement value for two hours by 4.

[Determination based on Changing Tendency of Integrated Value]

The abnormality detection device 1 not only determines existence of an abnormality for each certain period (for example, one day) when the integration unit 142 calculates an integrated value, but may also determine the existence of the abnormality based on a changing tendency of a plurality of integrated values calculated by the integration unit 142 over a plurality of periods. In this regard, the storage unit 13 stores an integrated value, calculated based on a plurality of differences between a plurality of opening degree actual measurement values measured during a plurality of periods and an opening degree target value, in association with periods when the plurality of opening degree actual measurement values are measured. Then, the determination unit 143 determines an abnormality of the vehicle based on the changing tendency of the plurality of integrated values during the plurality of periods (for example, the latest one month).

Figure 5A:
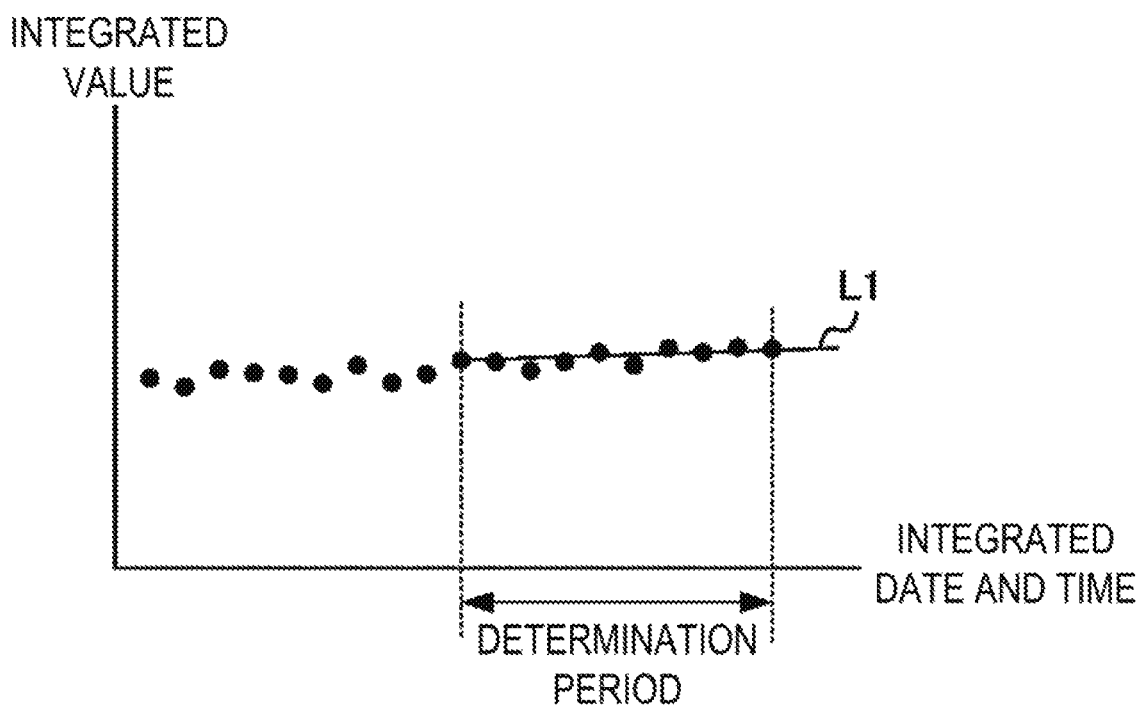
FIGS. 5A and 5B are diagrams for describing a method by which a determination unit makes a determination based on a changing tendency of integrated values.
Figure 5B:
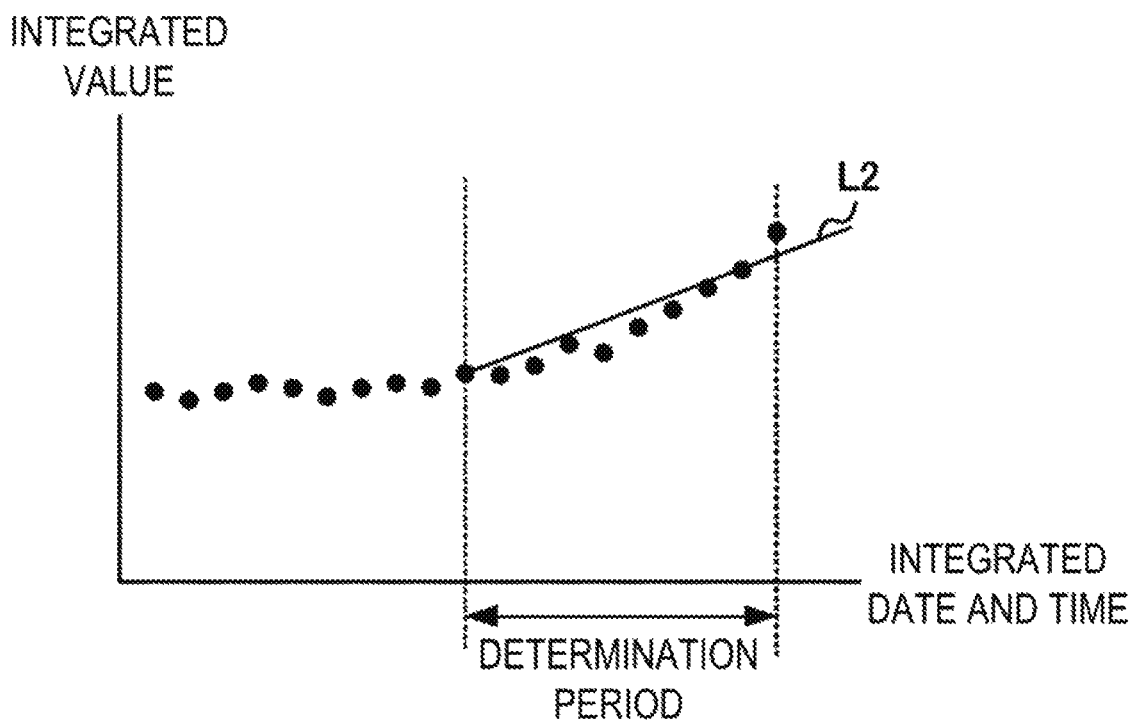

FIGS. 5A and 5B are diagrams for describing a method by which the determination unit 143 makes a determination based on the changing tendency of the integrated values. In FIG. 5, a horizontal axis indicates a day when an integrated value is calculated and a vertical axis indicates an integrated value. FIG. 5A shows changes of an integrated value when the EGR valve 52 does not have an abnormality. Upon receiving a notification of the integrated value from the integration unit 142, the determination unit 143 reads the integrated value calculated within a latest determination period from the storage unit 13 and specifies the changing tendency of the integrated value. The determination unit 143 specifies a changing amount of the integrated value within the determination period, that is, an inclination of a straight line L1 indicated in FIG. 5A, as the changing tendency. The determination unit 143 may determine the straight line L1 by, for example, obtaining a regression straight line based on the plurality of integrated values within the determination period.

The determination unit 143 detects an abnormality by comparing the changing tendency of the integrated value within the latest determination period with a normal range. In detail, the determination unit 143 determines whether the specified changing tendency is included in the normal range indicated by normal range information stored in the storage unit 13. For example, the determination unit 143 determines that the EGR valve 52 is normal when the inclination of the straight line L1 specified as the changing tendency is within a certain range, and determines that the EGR valve 52 is abnormal when the inclination of the straight line L1 is outside the normal range.

FIG. 5B shows changes of an integrated value when the EGR valve 52 has an abnormality. In FIG. 5B, an inclination of a straight line L2 specified by the determination unit 143 based on an integration value within a determination period is larger than the inclination of the straight line L1 shown in FIG. 5A. When the inclination of the straight line L2 is not within the normal range, the determination unit 143 determines that an abnormality has occurred in the EGR valve 52. When it is determined that the abnormality has occurred, the determination unit 143 notifies the abnormality notification unit 144 of identification information of the vehicle T associated with the integrated value determined to have the abnormality, and the occurrence of the abnormality.

Since the determination unit 143 determines the existence of the abnormality based on the changing tendency of the integrated value over a long period as such, an effect of a variation of components or a temporary change of a value decreases, and thus precision of detecting an abnormality is improved.

[Flowchart of Abnormality Detection Operation]

Figure 6:
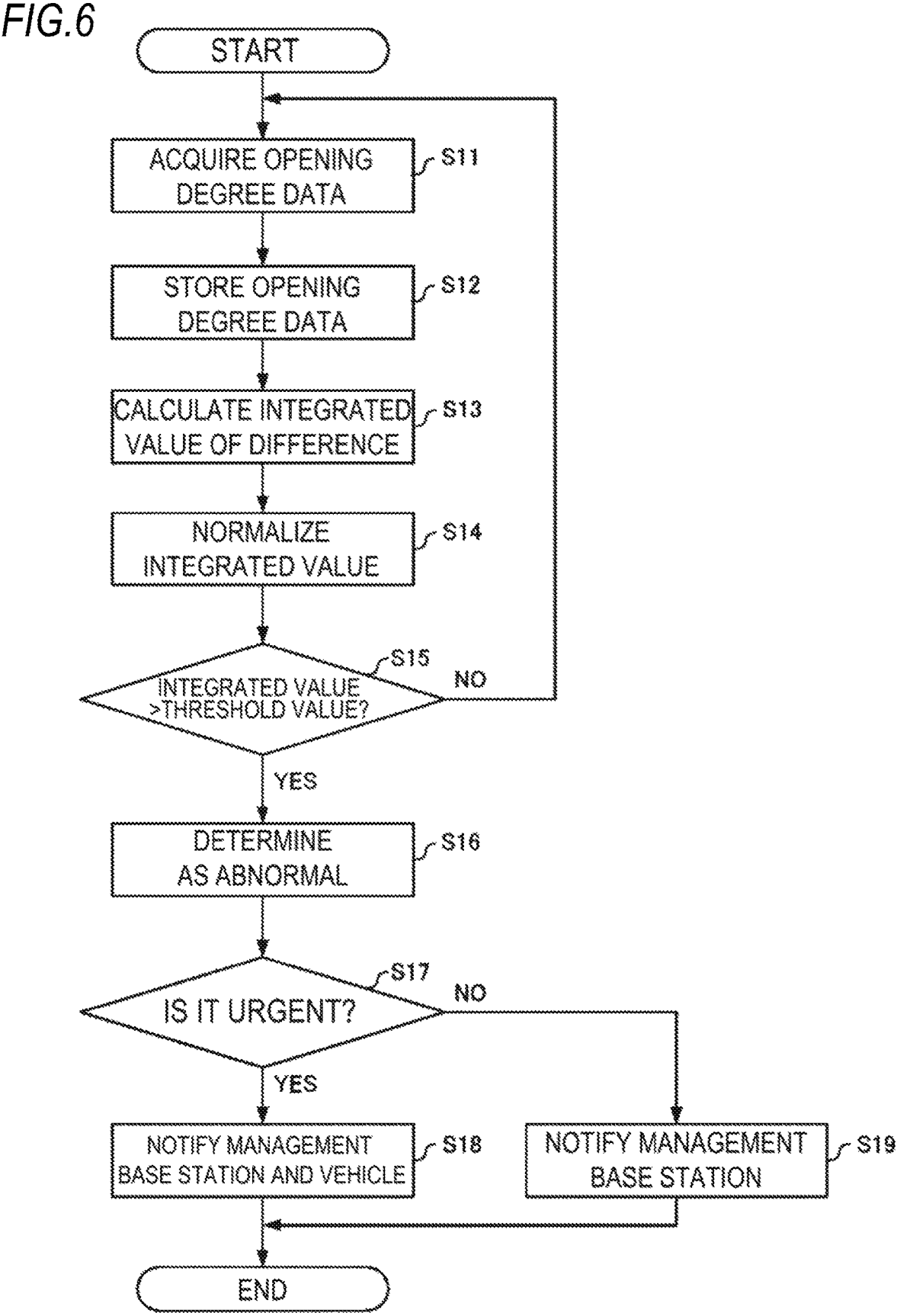
FIG. 6 is a flowchart of an operation by which an abnormality detection device detects an abnormality of an EGR valve.

FIG. 6 is a flowchart of an operation by which the abnormality detection device 1 detects an abnormality of the EGR valve 52.

First, the opening degree acquisition unit 141 acquires opening degree data transmitted from the vehicle T (step S11). Every time the opening degree data is acquired, the opening degree acquisition unit 141 associates the opening degree data with identification information of the vehicle T, and stores the opening degree data in the storage unit 13 (step S12).

When the opening degree acquisition unit 141 acquires new opening degree data, the integration unit 142 calculates an integrated value of a difference between an opening degree actual measurement value indicated by the opening degree data and an opening degree target value stored in the storage unit 13 (step S13). Also, the integration unit 142 normalizes the calculated integrated value by converting the calculated integrated value to an integrated value of a certain period (step S14). Subsequently, the determination unit 143 determines existence of an abnormality by comparing the integrated value with a certain threshold value (step S15).

When the integrated value is equal to or lower than the threshold value (NO in step S15) the determination unit 143 determines that an abnormality has not occurred, returns process to step S11, and stands by until next opening degree data is transmitted. When the integrated value is higher than the threshold value (YES in step S15), the determination unit 143 determines that an abnormality has occurred in the EGR valve 52 (step S16).

Here, the determination unit 143 determines whether a level of the abnormality is a level that requires an urgent response or a level that does not require an urgent response, and notifies the abnormality notification unit 144 of a level of urgency together with the occurrence of the abnormality. (step S17). Upon receiving a notification of an occurrence of an urgent abnormality (for example, an abnormality that causes inconvenience in driving), the abnormality notification unit 144 notifies both the management base station M and the vehicle T that the abnormality has occurred (step S18). Upon receiving a notification of an occurrence of an unimportant abnormality (for example, an abnormality in which deterioration of a component is estimated), the abnormality notification unit 144 notifies only the management base station M that the abnormality has occurred (step S19).

[Modified Example 1]

In the above description, in the vehicle T, the opening degree sensor 54 measures the opening degree of the EGR valve 52, but a unit for measuring the opening degree of the EGR valve 52 is not limited thereto. Since an intake amount changes according to the opening degree of the EGR valve 52, the vehicle T may specify the opening degree based on an intake amount detected by the intake flow rate sensor 40, and transmit opening degree data indicating the specified opening degree to the abnormality detection device 1. Also, the vehicle T may transmit intake amount data indicating the intake amount to the abnormality detection device 1, and the abnormality detection device 1 may specify the opening degree based on the intake amount data.

[Modified Example 2]

In the above description, a state of the vehicle when the opening degree data is measured is not considered, but the vehicle T may transmit state information indicating the state of the vehicle when the opening degree data is measured to the abnormality detection device 1 in association with the opening degree data. The state of the vehicle is, for example, a vehicle speed, an accelerator opening degree, an inclination of the vehicle, and the like.

In this case, the storage unit 13 stores the opening degree target value in association with the state of the vehicle. Then, the opening degree acquisition unit 141 acquires the opening degree data in association with the state information indicating the state of the vehicle T. Then, the integration unit 142 calculates an integrated value by integrating differences between a plurality of opening degree actual measurement values received from the vehicle T and an opening degree target value corresponding to the state information. In this manner, the abnormality detection device 1 may determine existence of an abnormality in consideration of a difference in characteristics of the EGR valve 52 according to the state of the vehicle, and thus precision of detecting an abnormality is improved.

[Modified Example 3]

In the above description, the integration unit 142 calculates a normalized integrated value by converting an integrated value to a reference period when a period during which an opening degree is measured is different from the reference period. On the other hand, the integration unit may perform normalization based on the number of times opening degree control information changed by a certain amount. For example, the storage unit 13 stores a reference number of times an opening degree is changed from 0% to 50% and a reference number of times an opening degree is changed from 50% to 0%, and when an actual number of times an opening degree is changed during a measurement period is lower than the reference number of times or is higher than the reference number of times, the integration unit 142 calculates a normalized integrated value by multiplying a calculated integrated value by the reference number of times/the actual number of times. Since an integrated value of a difference is increased immediately after an opening degree is changed, by performing normalization based on the number of times an opening degree is changed, prediction of detecting an abnormality is improved.

[Effect of Abnormality Detection Device 1 of Present Embodiment]

As described above, the abnormality detection device 1 receives opening degree data indicating opening degree actual measurement values measured at a plurality of different times from the vehicle T, and calculates an integrated value of differences between the opening degree actual measurement values and an opening degree target value. Then, the abnormality detection device 1 determines existence of an abnormality by comparing the integrated value with a certain threshold value. Accordingly, a possibility of erroneously detecting an abnormality due to a temporary change in an opening degree decreases, and thus precision of detecting an abnormality may be improved.

Also, the abnormality detection device 1 normalizes an integrated value based on a period during which an opening degree is measured and a reference period. Accordingly, the abnormality detection device 1 is able to perform conversion to a same reference period and determine existence of an abnormality even when there is a variation in the period when the opening degree is measured, and thus precision of detecting an abnormality may be further improved.

In addition, the abnormality detection device 1 may determine existence of an abnormality based on a changing tendency of a plurality of integrated values calculated by the integration unit 142 over a plurality of periods. Accordingly, an effect of a variation of components or a temporary change of a value decreases, and thus precision of detecting an abnormality may be further improved.

<Second Embodiment>

In the first embodiment, an abnormality of the EGR valve 52 is detected in the abnormality detection device 1 installed in the data collection center C, but the vehicle T may include an abnormality detection device equivalent to the abnormality detection device 1 of the first embodiment, and detect an abnormality of various valves, such as the EGR valve 52 and the like, in the vehicle T. In this case, when the abnormality detection device of the vehicle T detects an abnormality, the abnormality detection device of the vehicle T displays occurrence of the abnormality on an instrument panel and notifies a driver, or notifies the management base station of the occurrence of the abnormality.

Although the present disclosure has been described using embodiments, the technical scope of the present disclosure is not limited to the scope described in the above embodiments. It is obvious to one skilled in the art that various modifications or improvements can be added to the above embodiments. It is obvious from the description of the scope of claims that a mode with such modifications or improvements can also be included in the technical scope of the present disclosure.

The present application is based on Japanese Patent Application (Japanese Patent Application No. 2016-075411) filed on Apr. 4, 2016, the contents of which are incorporated herein by reference.

INDUSTRIAL APPLICABILTY

According to the abnormality detection device, the abnormality detection method, and the abnormality detection system of the present disclosure, prediction of detecting an abnormality of a valve may be improved.

REFERENCE SIGNS LIST

1 Abnormality Detection Device
2 Intake and Exhaust System
11 First Communication Unit
12 Second Communication Unit
13 Storage Unit
14 Control Unit
20 Engine
20a Intake Manifold
20b Exhaust Manifold
21 Intake Passage
22 Exhaust Passage
23 Throttle Valve
24 Intercooler
30 Variable Nozzle Turbo
30a Compressor
30b Turbine
30c Variable Nozzle
40 Intake Flow Rate Sensor
41 Intake Pressure Sensor
50 EGR Device
51 EGR Passage
52 EGR Valve
53 EGR Cooler
54 Opening Degree Sensor
60 ECU
70 Communication Unit
141 Opening Degree Acquisition Unit
142 Integration Unit
143 Determination Unit
144 Abnormality Notification Unit

The invention claimed is:

1. An abnormality detection system comprising:
an opening degree detection device mounted on a vehicle; and
an abnormality detection device for detecting an abnormality of a valve based on an opening degree of the valve detected by the opening degree detection device, wherein
the opening degree detection device includes
a detection unit, which detects the opening degree of the valve, and
a communication unit, which transmits opening degree data indicating the opening degree to the abnormality detection device via a wireless communication line, and
the abnormality detection system includes:
an acquisition unit, which acquires a plurality of opening degree data indicating an opening degree of a valve included in a vehicle, the opening degree being measured during a certain period;
an integration unit, which calculates an integrated value of a plurality of differences by integrating the plurality of differences between a plurality of opening degree actual measurement values indicated by the plurality of opening degree data acquired by the acquisition unit and an opening degree target value of the valve; and
a determination unit, which determines that there is an abnormality in the vehicle when the integrated value integrated by the integration unit is higher than a certain value.

2. An abnormality detection device comprising:
an acquisition unit, which acquires a plurality of opening degree data indicating an opening degree of a valve included in a vehicle, the opening degree being measured during a certain period;
an integration unit, which calculates an integrated value of a plurality of differences by integrating the plurality of differences between a plurality of opening degree actual measurement values indicated by the plurality of opening degree data acquired by the acquisition unit and an opening degree target value of the valve; and
a determination unit, which determines that there is an abnormality in the vehicle when the integrated value integrated by the integration unit is higher than a certain value.

3. The abnormality detection device according to claim 2, wherein
the integration unit calculates a normalized integrated value by converting the integrated value obtained by integrating the plurality of differences between the plurality of opening degree actual measurement values measured during the certain period and the opening degree target value into an integrated value of a reference period, and
the determination unit determines that there is an abnormality in the vehicle when the normalized integrated value is higher than the certain value.

4. The abnormality detection device according to claim 2, further comprising
a storage unit, which stores the integrated value calculated based on the plurality of differences between the plurality of opening degree actual measurement values measured during a plurality of certain periods and the opening degree target value, in association with a period when the plurality of opening degree actual measurement values are measured, wherein
the determination unit determines an abnormality of the vehicle based on a changing tendency of a plurality of the integrated values in the plurality of certain periods.

5. The abnormality detection device according to claim 2, wherein
the acquisition unit acquires the opening degree data in association with state information indicating a state of the vehicle, and
the integration unit calculates the integrated value of the plurality of differences by integrating the plurality of differences between the plurality of opening degree actual measurement values and the opening degree target value corresponding to the state information.

6. An abnormality detection method performed by a computer, the method comprising:
   acquiring a plurality of opening degree data indicating an opening degree of a valve included in a vehicle, the opening degree being measured during a certain period;
   calculating an integrated value of a plurality of differences by integrating the plurality of differences between a plurality of opening degree actual measurement values indicated by the acquired plurality of opening degree data and an opening degree target value of the valve; and
   determining that there is an abnormality in the vehicle when the integrated value is higher than a certain value.

* * * * *